United States Patent Office 3,261,787
Patented July 19, 1966

3,261,787
RESIN SOLUTION COMPRISING A PHENOL-ALDE-
HYDE RESIN AND A POLYEPOXIDE-ROSIN RE-
ACTION PRODUCT
John A. Davies and John H. Hutchins, Athens, Ga.,
assignors to Champion Papers Inc., Hamilton, Ohio,
a corporation of Ohio
No Drawing. Filed Sept. 30, 1963, Ser. No. 312,316
8 Claims. (Cl. 260—25)

This invention relates to a printing ink vehicle and more particularly to a water base ink suitable for use in printing on polyolefin surface, such as polyethylene and polypropylene.

The printing of polyethylene has presented a challenge for a number of years and though it can be carried out with certain inks, these have, to the best of our knowledge, all been of the spirit type, that is, containing an organic solvent such as alcohol, or combinations of various solvents, for example ethyl acetate, as well as various other aliphatic and aromatic solvents. The use of spirit inks has numerous drawbacks including the cost of the solvents, the dangers of flammability and toxicity; also special measures have had to be taken in order to prevent drying out on the press. Printing on polyolefin surfaces with spirit inks is still not entirely satisfactory; for example, with certain inks good adherence is obtained initially, but after a matter of hours or a few days the ink will release or spall off. Thus, permanence and reliability have not been solved completely.

Aqueous base inks have been much desired not only for reasons of lower cost, but also for greater ease of clean-up on the press. But the prior water base inks have been deficient in water-resistance and adherence to plastics, films and the like.

The present invention employs a vehicle consisting essentially of a bisphenol-formaldehyde condensate blended with rosin and polyepoxide, or a partial reaction product thereof, dissolved in an ether alcohol-water mixture in the presence of a limited proportion of volatile base. To this vehicle can then be added the conventional dye stuffs or pigments as desired for the particular color of ink to be produced. The vehicle of our invention can be modified by incorporation of certain compatible materials. For example, where a lower gloss is desired, shellac can be added to the formulation.

Rosin, particularly in the form of derivatives, has been used extensively in printing inks. The structure of the abietic acid and related resin acids found in rosin permits hardening by oxidation. This facilitates formation of desired ink films.

Efforts have also been made to use rosin in water base printing inks, for example U.S. Patents No. 2,468,633 and No. 2,536,555. Such uses, however, rely upon rosin per se or those modified forms of rosin which have a high acid value and are alkali soluble. The corresponding ink films are water sensitive even after drying and are unsatisfactory where exposure to moisture is encountered.

Other rosin derivatives, such as maleic modified rosin materials, and various phenolic resins have not been found suitable. When dispersed in aqueous systems to form an ink vehicle the resultant ink films are unsatisfactory for adherence to polyethylene, tend to water-spot and are not resistant to even mild alkaline solutions.

In particular, we have discovered that a low cost water based vehicle having very strong adherence to polyethylene and at the same time excellent resistance to moisture, alkalies and detergents can be formed by a combination of water, glycol ether, volatile alkali, and a blend of film-forming resinous materials as broadly indicated hereinbefore.

The resinous materials which are blended in accordance with the invention consist essentially of a bisphenol-formaldehyde condensate, rosin and polyepoxide.

The bisphenol-formaldehyde condensate used is an essentially linear, heat-hardening, alkaline-condensed, water-soluble condensation product of a tetra-functional bisphenol with formaldehyde. Formaldehyde itself, or any of the well known agents which supply formaldehyde may be used.

A bisphenol is a chemical compound in which two phenolic groups are joined together through an intervening divalent aliphatic group. In the more common and preferred bisphenols, the phenolic hydroxyl groups are para to an aliphatic hydrocarbon bridge. The positions ortho to the phenolic hydroxyl groups are active and termed functional. When a bisphenol is unsubstituted in the four positions ortho to the phenolic hydroxyl groups, it is tetrafunctional. It is these tetrafunctional bisphenols which are used in the invention.

The preferred bisphenols have the formula:

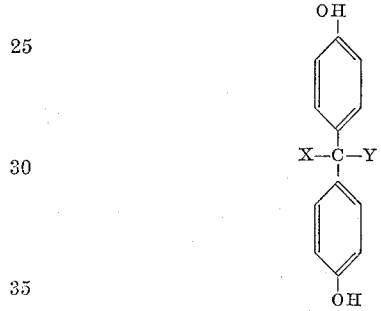

where X and Y are lower alkyl radicals containing from 1 to 4 carbon atoms or hydrogen, as particularly illustrated by bisphenol A having the formula:

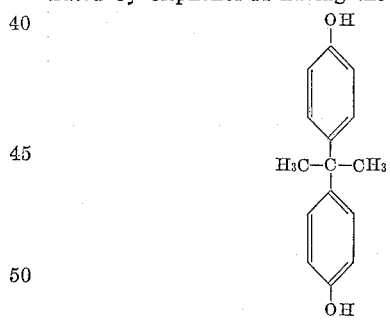

The reaction of the bisphenol with formaldehyde is conducted in alkaline medium to produce an essentially linear condensation product corresponding generally with the formula:

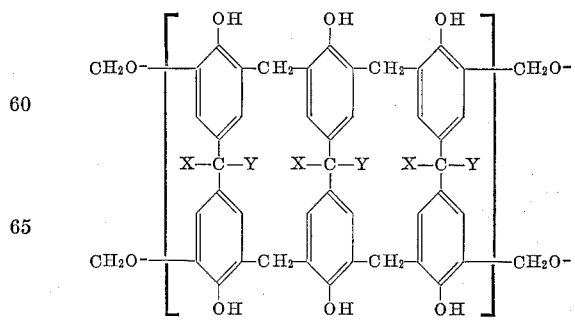

in which X and Y are as previously defined.

These products include sufficient methylol reactivity to be heat hardening and molecular weight is limited to maintain water solubility. Proportions of formaldehyde which are broadly suitable are from about 1.6 to about 2.4 moles of formaldehyde per mole of tetrafunctional bisphenol, preferably from 1.8 to 2.2 moles of formaldehyde on the same basis.

The reaction may be carried out in aqueous medium or in solvent solution or in bulk (molten mass). Also, the bisphenol may be reacted with formaldehyde in the absence or presence of the rosin component.

The invention appears to require the use of rosin, but it should be understood that one may use crude rosin, purified rosin or abietic acid itself.

The polyepoxide used is essentially a diepoxide, the 1,2 epoxy functionality permissibly varying from about 1.3 up to about 2.0. Polyepoxides of significantly greater functionality tend to cause excessive insolubility and are desirably avoided. The preferred polyepoxides are polyglycidyl ethers of polyhydric organic compounds. Thus, the diglycidyl ether of a bisphenol or ethylene glycol may be used, the aromatic backbone of bisphenols being preferred. Polyepoxides having a molecular weight in the range of 250–600 may be used, preferably aromatic polyepoxides based on a bisphenol and having a molecular weight in the range of from 300–400.

The proportion of rosin to polyepoxide may vary considerably, approximately stoichiometric proportions based upon carboxyl in the rosin and oxirane in the polyepoxide being preferred. On this equivalent basis, ratios of from 0.25:1 to 1:0.25 may be used, preferably from 0.5:1 to 1:0.5, and most preferably from 0.8:1 to 1:0.8.

The rosin and polyepoxide are heat-reacted with one another either alone or in the presence of the bisphenol-formaldehyde condensate. The reaction appears to be only a partial reaction since the final product retains a measurable carboxyl functionality.

The relative proportions of bisphenol-formaldehyde condensate and rosin-polyepoxide are broadly within the range of from 50:50 to 90:10, preferably within the range of from 60:40 to 80:20, by weight. A weight ratio of 70:30 is particularly preferred.

The final resinous products in accordance with the invention are solids melting above 110° C., preferably in the range of from 120° C.–180° C., and most preferably in the range of 135–145° C. These products possess a measurable acidity upon sodium hydroxide titration. Acid numbers of from about 30 to about 200 are contemplated, preferably from 50–150, and most preferably from 70–100. On this basis, it is concluded that the rosin component is not completely reacted with the polyepoxide and partial reaction of rosin carboxyl groups with methylol groups in the bisphenol-formaldehyde condensate is suspected.

When melting point is referred to herein, the melting point is determined by the mercury method.

The solvent medium in accordance with the invention consists essentially of water-miscible ether alcohol and water, it being understood that volatile base, preferably ammonia, is essential to the dissolving action. In the discussion which follows, percentages are by weight, based on the assumption that the ether alcohol and water components are the only constituents of the solvent, but it will be understood that minor proportions of water-miscible solvents can also be present so long as the essential solvent action is provided by the ether alcohol and water in the presence of the volatile base.

Any water-miscible and volatile glycol ether may be used and these may be generally described as $C_1$–$C_4$ alkyl ethers of glycols containing up to 6 carbon atoms in the molecule. These glycols are illustrated by ethylene glycol, propylene glycol, butylene glycol, diethylene glycol and dipropylene glycol. The preferred glycol ethers are the mono-methyl, mono-ethyl, mono-propyl and mono-butyl ethers of ethylene glycol.

The proportion of water in the solvent mixture may vary from about 20% to about 75% of total solvent by weight, but is preferably in the range of from 40–60% by weight. Most preferably, the proportion of water is in the range of from 45–55% by weight. While there are numerous variables, one would prefer to use maximum total resin solids consistent with the desired viscosity of the ink to be produced and maximum water consistent with the maintenance of a stable and clear solution.

The proportion of volatile base is also important. With larger proportions of base and increasing pH in the range of from pH 7.5 to pH 9.5, preferably from pH 7.5 to pH 9.0, the greater is the proportion of water which can be tolerated in the solvent mixture. Unless some base is present, water cannot be tolerated. Excessive proportions of base are detrimental since this leads to instability evidenced by a partial precipitation of resin.

Any volatile base may be used, especially ammonia which may be used as such or in the form of aqueous ammonium hydroxide. Other bases which are suitable are volatile nitrogenous bases such as lower boiling amines illustrated by morpholine, monoethanol amine, di-isopropyl amine and N-methyl butyl amine.

Using concentrated ammonium hydroxide (26° Baumé) since it is particularly convenient, the clear solution may contain from 1–15 weight percent thereof, but preferred practice employs smaller proportions, e.g., from 2–10% and more preferably from 3–6% by weight, based on total vehicle.

Dissolution of solid resin into the solvent medium may be effected in any convenient manner as by simple agitation at room temperature. While room temperature stirring is quite convenient in many instances, there are occasions where heat is helpful. The use of elevated temperature dissolution favors the use of smaller proportions of base and permits a somewhat higher proportion of water to be present. Also, and where conditions are marginal, heat dissolution favors more stable solutions. 190° F. is an illustration of a preferred temperature for dissolution under marginal conditions.

While the proportion of volatile base which may be present in the clear vehicle solution is limited, some additional volatile base which would tend to cause some precipitation in the clear solution may be added without harm after the solution has been pigmented. Thus, a 0.5% solution of ammoniated water can be added to the finished ink even though the same addition might be detrimental to the clear solution. Apparently, the pigments are able to tie up a proportion of excess base to prevent detriment to the stability of the resinous components in solution.

The nature of the solution which is obtained is not entirely clear. The proportion of water and the need for a small amount of volatile base are indicative of water solution as is the rapid deposition of the resins from solution when a film of the solution is subjected to an elevated temperature bake. On the other hand, the invention particularly contemplates the use of bisphenol diglycidyl ethers and these are notoriously insoluble in water as is rosin itself. Also, the fact that excessive volatile base causes precipitation is peculiar and not subject to ready explanation. Accordingly, it is concluded that the invention is critical in nature, and, essentially, not subject to complete understanding.

Although the vehicles of the invention are adapted to dry in air at room temperature and in the absence of added driers, it is preferred to employ hot air to speed drying, air temperatures of from 250–500° F. being broadly suitable. While drier compounds are not needed, their presence is not excluded.

The production of a typical resinous mixture useful in the invention is as follows:

EXAMPLE I (All parts by weight)

12 parts of a diglycidyl ether of Bisphenol A having an average molecular weight of 380 and an epoxy equivalent weight of 190 are mixed with 18 parts of gum rosin (mm. grade) and heated to 180° C. with occasional stirring. 63.5 parts of Bisphenol A are added to the melt and heating is continued to maintain the temperature in the range of 180–190° C. with agitation to provide a uniform mixture which is then cooled to 140° C. with stirring. 6.5 parts of paraformaldehyde are then added together with sufficient sodium hydroxide to provide a pH of 9 for a sample placed in 20% aqueous solution and the mixture is heated to 270° C. At this temperature the desired inter-reaction takes place and water and some excess formaldehyde boil off. The reaction is continued until specimens drawn off have a melting point in the range of 125–140° C. whereupon the molten reaction product is poured into trays, cooled to a solid and broken up and pulverized to facilitate dissolution. This product has an acid number of 80–90 upon sodium hydroxide titration.

349 pounds of the pulverized solid resin are then agitated at room temperature in a mixture of 321 pounds of 2-methoxy ethanol and 331 pounds of tap water to which has been added 20 pounds of a 28% aqueous ammonia solution. The resin dissolves in about 3 hours to provide a clear, amber solution. This solution is highly useful as an ink vehicle which can be applied to polyethylene surfaces.

Bisphenol A has the chemical structure:

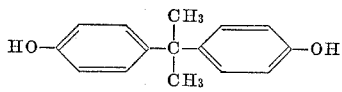

Our invention is further illustrated by the following examples.

EXAMPLE II

| | Parts |
|---|---|
| Water | 86 |
| 2-ethoxy ethanol | 97 |
| Concentrated ammonium hydroxide (26° Baumé) | 5.7 |
| 100 parts pulverized resin product of Example I. | |

The liquids are first blended together and the resin added as a powder with agitation until it is put into solution. An ink is made employing the foregoing vehicle consisting of:

| | Parts |
|---|---|
| Lithal red—106 | 3 |
| Above vehicle | 17 |
| 20 percent solution of a higher melting point petroleum wax slip agent in isopropyl alcohol | 1.2 |

Any tendency to foam is avoidable by the use of conventional anti-foaming agents, e.g., silicone type anti-foam agents in an amount of 0.08 part are effective.

This ink is used on a flexographic printing press to print polyethylene coated paperboard milk containers. After drying, the ink is completely water insoluble, showing no tendency to water-spot and showing good adherence as tested by Scotch tape method for adherence and 24 hour water drop test on the printed film. The adherence of the ink to the polyethylene coated container is equally good after 25 weeks, at which point the tests were discontinued.

EXAMPLE III

| | Parts |
|---|---|
| Water | 300 |
| Concentrated ammonium hydroxide (26° Baumé) | 100 |
| Shellac (gum lac) | 110 |
| Pulverized resin product of Example I | 170 |
| 2-ethoxy ethanol | 90 |
| Isopropyl alcohol (99%) | 190 |
| High melting point petroleum wax | 20 |

The water, alcohol, 2-ethoxy ethanol and ammonium hydroxide are combined and heated to 190° F. The shellac is then added gradually with stirring until completely dispersed. The resin of Example I is then similarly added with agitation until completely dispersed. Various inks are made from this vehicle by adding the desired pigment, toner, and grinding in a ball mill until uniformly dispersed.

Various additives can be incorporated for special purposes. For example, high melting point petroleum waxes may be incorporated in some cases as a slip agent. Isopropyl alcohol or other alcohols may be used to facilitate dispersing the wax. This is desirable to prevent blocking and offset when printed sheets, blanks, cartons or the like are jogged one against the other to form a stack or pile. Polyethylene waxes, fatty ketones, and various synthetic waxes can also be incorporated into the formulation when properly dispersed with an active solvent. As another example, shellac can be used where it is desirable to reduce gloss and anti-foaming agents such as commercially available silicone compounds known for this purpose can be employed to eliminate any tendency toward foaming.

Inks produced using our vehicles are particularly suited for the printing of food containers having polyethylene surfaces which are kept under refrigeration. Examples of such containers are polyethylene coated milk containers, frozen food containers, polyethylene cottage cheese containers and the like. These containers frequently must be subjected to water such as being immersed in ice water during transport from a food processing plant, such as a dairy to the food store; in some cases ice or ice water may be employed or refrigeration in store display cases. Similarly, a milk container may be rinsed with water immediately after filling to remove any milk from the exterior. Often in summertime condensation occurs on the chilled containers. In all such cases in order to retain maximum appearance, the ink must not watermark, whiten or otherwise become discolored.

Of course, and while polyethylene represents a printing problem of particular note, the vehicles of the invention are useful for printing plastic surfaces generally and also as vehicles for general printing ink purposes.

Our ink vehicles permit the production of inks which are unaffected by water spotting, have high gloss, bright appearance, good adherence to polyolefin surface, and are hard and non-blocking. Although shellac will normally tend to water-spot, inks made according to our invention are free of this tendency provided the amount of shellac is not excessive.

The invention is defined in the claims which follow.

We claim:
1. An aqueous vehicle comprising a blend of resins dissolved in a solvent medium;
 (1) said solvent medium consisting essentially of:
  (1.1) a water-miscible and volatile ether alcohol;
  (1.2) water, said water comprising from about 20% to about 75%, based on the total weight of (1.1) and (1.2); and,
  (1.3) a volatile base in a sufficient quantity to provide said solvent medium (1) with a pH of from about 7.5 to about 9.5;
 (2) said blend of resins consisting essentially of a blend of:
  (2.1) an essentially linear, heat-hardening, alkaline-condensed, water-soluble condensation product of a tetrafunctional bisphenol and formaldehyde, with
  (2.2) the partial reaction product of:
   (2.21) rosin, and
   (2.22) a polyepoxide having a 1,2 epoxy functionality of from about 1.3 to about 2.0 and a molecular weight in the range of about 250–600;

said rosin being reacted with said polyepoxide in equivalent proportions of about 0.25:1.0 to 1.0:0.25, based on the carboxyl in said rosin and the oxirane in said polyepoxide; said condensation product (2.1) and said partial reaction product (2.2) being blended in a weight ratio of from about 50:50 to 90:10 to form a solid resin having a melting point above 110° C. and an acid number of from about 30 to about 200.

2. An aqueous vehicle as recited in claim 1 in which said solvent medium consists essentially of water and an alkoxy ethanol wherein the alkoxy group contains from 1 to 4 carbon atoms in a weight ratio of from 40:60 to 60:40, said polyepoxide is a polyglycidyl ether of an aromatic dihydroxy compound and said condensation product is blended with said rosin-polyepoxide in a weight ratio of from 60:40 to 80:20 to form a solid resin having a melting point in the range of 120–180° C. and an acid number in the range of from 50–150.

3. An aqueous vehicle as recited in claim 2 in which said volatile base is ammonia present in an amount to provide a pH in the range of pH 7.5–9.0 and said rosin and said polyepoxide are partially reacted in equivalent proportions of from 0.5:1 to 1:0.5.

4. An aqueous vehicle as recited in claim 3 in which said bisphenol has the formula:

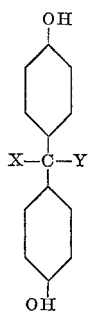

in which X and Y are selected from the group consisting of hydrogen and lower alkyl radicals containing from 1 to 4 carbon atoms and said bisphenol is heat-reacted with formaldehyde in an amount of from 1.8 to 2.2 moles of formaldehyde per mole of bisphenol.

5. An aqueous vehicle comprising a blend of resins dissolved in a solvent medium;
(1) said solvent medium consisting essentially of:
(1.1) an alkoxy ethanol wherein the alkoxy group contains from 1 to 4 carbon atoms;
(1.2) water, said water comprising from 40% to 60%, based on the total weight of (1.1) and (1.2); and,
(1.3) ammonium hydroxide in a sufficient quantity to provide said solvent medium (1) with a pH in the range of pH 7.5–9.0;
(2) said blend of resins consisting essentially of a blend of:
(2.1) an essentially linear, heat-hardening, alkaline-condensed, water-soluble condensation product of a tetrafunctional bisphenol having the formula:

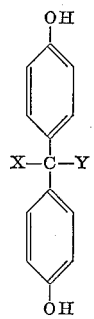

in which X and Y are selected from the group consisting of hydrogen and lower alkyl radicals containing from 1–4 carbon atoms, and formaldehyde, said bisphenol being heat-reacted with formaldehyde in an amount of from 1.8 to 2.2 moles of formaldehyde per mole of said bisphenol, with
(2.2) the partial reaction product of:
(2.21) rosin, and
(2.22) normally liquid diglycidyl ether of a bisphenol as defined above; said rosin being reacted with said diglycidyl ether in equivalent proportions of 0.8:1 to 1:0.8, based on the carboxyl in said rosin and the oxirane in said diglycidyl ether;
said condensation product (2.1) and said partial reaction product (2.2) being blended in a weight ratio of from 60:40 to 80:20 to form a solid resin having a melting point in the range of 135–145° C. and an acid number of from 70–100.

6. An aqueous vehicle as recited in claim 5 in which said ammonium hydroxide is employed in an amount corresponding to from 2–10% by weight, based on the total weight of said vehicle, of a 26° Baumé aqueous solution thereof.

7. An aqueous vehicle as recited in claim 5 in which said blend of resins is dissolved in said solvent medium at an elevated temperature of about 190° F.

8. A printing ink adapted to form moisture-resistant films adherent to polyolefin surfaces comprising the aqueous vehicle of claim 1 containing coloring matter selected from the group consisting of dyestuffs and pigments.

References Cited by the Examiner

UNITED STATES PATENTS

| 2,389,078 | 11/1945 | Powers | 260—25 |
| 2,468,633 | 4/1949 | Lauderman | 106—24 |
| 2,536,555 | 1/1951 | Lauderman | 106—30 |

FOREIGN PATENTS 124,097  5/1947  Australia.

OTHER REFERENCES

Lee et al., Epoxy Resins, McGraw-Hill Book Co., 1957, page 17 relied on.

LEON J. BERCOVITZ, *Primary Examiner.*

F. McKELVEY, *Assistant Examiner.*